United States Patent
Adams

(10) Patent No.: US 7,811,540 B2
(45) Date of Patent: Oct. 12, 2010

(54) METHOD OF PREPARING HYDROPHOBIC SILICA DIRECTLY FROM AN AQUEOUS COLLOIDAL SILICA DISPERSION

(75) Inventor: Curtis E. Adams, Watertown, MA (US)

(73) Assignee: Cabot Corporation, Boston, MA (US)

( * ) Notice: Subject to any disclaimer, the term of this patent is extended or adjusted under 35 U.S.C. 154(b) by 759 days.

(21) Appl. No.: 11/254,440

(22) Filed: Oct. 20, 2005

(65) Prior Publication Data

US 2006/0171872 A1 Aug. 3, 2006

Related U.S. Application Data

(60) Provisional application No. 60/620,589, filed on Oct. 20, 2004.

(51) Int. Cl.
*C01B 33/12* (2006.01)
*C01B 33/14* (2006.01)
*C01B 33/159* (2006.01)

(52) U.S. Cl. .................. 423/335; 106/490; 524/261; 528/31; 427/220

(58) Field of Classification Search ................ 423/335; 106/490; 524/261; 528/31; 427/214, 220
See application file for complete search history.

(56) References Cited

U.S. PATENT DOCUMENTS

| | | | |
|---|---|---|---|
| 2,786,042 A | 3/1957 | Iler | |
| 3,015,645 A | 1/1962 | Tyler | |
| 3,810,843 A | 5/1974 | Slusarczuk et al. | |
| 3,850,971 A | 11/1974 | Termin et al. | |
| 4,208,316 A | 6/1980 | Nauroth et al. | |
| 4,344,800 A | 8/1982 | Lutz | |
| 5,009,874 A * | 4/1991 | Parmentier et al. | ........... 423/335 |
| 5,226,930 A | 7/1993 | Sasaki | |
| 5,900,315 A | 5/1999 | Little | |
| 5,919,298 A * | 7/1999 | Griffith et al. | ............... 106/490 |
| 5,989,768 A | 11/1999 | Little | |
| 6,022,404 A | 2/2000 | Ettlinger et al. | |
| 6,051,672 A | 4/2000 | Burns et al. | |
| 6,174,926 B1 | 1/2001 | Menon et al. | |
| 6,203,960 B1 | 3/2001 | Ciccarelli et al. | |
| 6,303,256 B1 | 10/2001 | Kerner et al. | |
| 6,489,075 B2 | 12/2002 | Suzuki et al. | |
| 6,555,282 B2 | 4/2003 | Okuno et al. | |
| 2002/0107316 A1 * | 8/2002 | Bice et al. | ................... 524/493 |
| 2003/0003277 A1 | 1/2003 | Morris et al. | |

FOREIGN PATENT DOCUMENTS

| | | |
|---|---|---|
| EP | 0 475 132 A1 | 3/1992 |
| GB | 1110331 | 4/1968 |
| JP | 57-78549 A | 5/1982 |

OTHER PUBLICATIONS

Cabot Corporation, "CAB-O-SIL MS-75D" data sheet, Jun. 2008.*
Blitz et al., *J. Am. Chem. Soc.*, 109(23): 7141-7145 (1987).
*Syton® HT-50 Colloidal Silica Slurry*: 1-2 (DuPont Air Products NanoMaterials L.L.C.) (Feb. 7, 2001).
Pohl et al., "Kinetics and Mechanism of Aqueous Hydrolysis and Condensation of Alkyltrialkoxysilanes," *Molecular Characterization of Composite Interfaces*, (H. Ishida and G. Kumar, eds.), 157-170 (Plenum Press, NY 1985).

* cited by examiner

*Primary Examiner*—Stuart Hendrickson
*Assistant Examiner*—Diana J Liao

(57) ABSTRACT

The invention provides a method of preparing hydrophobic silica particles comprising (a) providing an aqueous colloidal silica dispersion comprising about 5-70 wt. % of silica particles having an average overall particle size of about 10-1000 nm, wherein the silica particles comprise surface silanol groups, (b) combining the silica dispersion with about 3-75 $\mu mole/m^2$ (based on the BET surface area of the silica) of a silyl amine treating agent and optionally with other ingredients to provide a reaction mixture, wherein the reaction mixture has a pH of about 7 or more, and comprises no more than about 50 wt. % of an organic solvent, and (c) drying the dispersion to provide hydrophobic silica particles. The invention further provides a method of preparing a toner composition comprising combining the hydrophobic silica particles as recited above with toner particles to provide a toner composition.

38 Claims, No Drawings

US 7,811,540 B2

METHOD OF PREPARING HYDROPHOBIC SILICA DIRECTLY FROM AN AQUEOUS COLLOIDAL SILICA DISPERSION

CROSS REFERENCE TO RELATED APPLICATIONS

This U.S. non-provisional patent application claims priority to U.S. provisional patent application No. 60/620,589 filed Oct. 20, 2004.

FIELD OF THE INVENTION

This invention pertains to a method of preparing hydrophobic silica particles, as well as to methods of preparing compositions comprising hydrophobic silica particles.

BACKGROUND OF THE INVENTION

Hydrophobic silica particles possess physical properties that are useful in a number of applications requiring a high degree of dispersibility, including use in toner compositions, as antiblocking agents, as adhesion modifiers, and as polymer fillers. Untreated silica particles are hydrophilic due to the presence of silanol groups (Si—OH) on the surface of the untreated silica particles. By treating hydrophilic silica particles, the hydrophilic nature of the silica particles can be reduced, thereby imparting varying degrees of hydrophobicity to the particles.

Many different methods are known for treating the surface of silica particles. Some methods involve coating the particles with a silicone-type composition or other hydrophobic composition. Other methods involve reacting the surface silanol groups with a treating agent to effectively replace the hydrophilic silanol groups with other, hydrophobic, chemical groups. However, many treating agents are difficult to disperse in water, or tend to hydrolyze in water prior to replacing the surface silanol groups. Thus, the direct treatment of an aqueous dispersion of silica is often inefficient or difficult to achieve. As a result, these types of treatments are often acid-catalyzed reactions, or require the use of organic solvents.

Thus, a need still exists for simple and economical methods of preparing hydrophobic silica particles, especially methods that can be used to prepare hydrophobic silica directly from an aqueous dispersion of silica. The present invention provides such a method. These and other advantages of the invention will be apparent from the description of the invention provided herein.

BRIEF SUMMARY OF THE INVENTION

The invention provides a method of preparing hydrophobic silica particles comprising (a) providing an aqueous colloidal silica dispersion comprising about 5-70 wt. % of hydrophilic silica particles, wherein the hydrophilic silica particles have an average overall particle size of about 10-1000 nm, (b) combining the dispersion with about 3-75 µmole/m² (based on the BET surface area of the hydrophilic silica particles) of a silyl amine treating agent to provide a reaction mixture, wherein the reaction mixture has a pH of about 7 or more and comprises no more than about 20 wt. % of an organic solvent, and (c) drying the dispersion to provide hydrophobic silica particles. The invention further provides a method of preparing a toner composition and a method of preparing a polymer composition, which methods comprise (a) preparing hydrophobic silica particles in accordance with the method of the invention and (b) combining the hydrophobic silica particles with toner particles or a polymer, as appropriate.

DETAILED DESCRIPTION OF THE INVENTION

The invention provides a method of preparing hydrophobic silica particles comprising (a) providing an aqueous colloidal silica dispersion comprising about 5-70 wt. % of hydrophilic silica particles, wherein the hydrophilic silica particles have an average overall particle size of about 10-1000 nm, (b) combining the dispersion with about 3-75 µmole/m² (based on the BET surface area of the hydrophilic silica particles) of a silyl amine treating agent to provide a reaction mixture, wherein the reaction mixture has a pH of about 7 or more and comprises no more than about 50 wt. % of an organic solvent, and (c) drying the dispersion to provide hydrophobic silica particles.

The term "silyl amine treating agent" as used in the context of the present invention refers to an organosilicon compound (or a mixture of organosilicon compounds) comprising a Si—N bond that is capable of reacting with silanol groups on the surface of the silica particles. Any suitable silyl amine treating agent can be used. The silyl amine treating agent can be water-miscible or water-immiscible. Suitable compounds include those of the general formula $(R_3Si)_n NR'_{(3-n)}$ wherein n=1-3; each R is independently selected from the group consisting of hydrogen, a $C_1$-$C_{18}$ alkyl or branched alkyl, a $C_3$-$C_{18}$ haloalkyl, vinyl, a $C_6$-$C_{14}$ aromatic group, a $C_2$-$C_{18}$ alkenyl group, a $C_3$-$C_{18}$ epoxyalkyl group, and linear or branched $C_m H_{2m} X$, wherein m is 1-18; each R' is independently hydrogen, $C_1$-$C_{18}$ alkyl or branched alkyl, or when n=1, a $C_2$-$C_6$ cyclic alkylene; X is $NR''_2$, SH, OH, OC(O)CR''=CR''$_2$, $CO_2 R''$, or CN; and wherein R'' is independently hydrogen, a $C_1$-$C_{18}$ alkyl or branched alkyl, a $C_2$-$C_{18}$ unsaturated group, a $C_1$-$C_{18}$ acyl or $C_3$-$C_{18}$ unsaturated acyl group, a $C_2$-$C_6$ cyclic alkylene or a $C_6$-$C_8$ aromatic group. The treating agent may also be a bisaminodisilane or a disilane of the general formula $R'_2 N$—$SiR_2$-$(Z$-$SiR_2)_p$—$NR'_2$ where Z is $C_1$-$C_{18}$ linear or branched alkylene, O, NR' or S and p is 0-100. Preferably, each R' is H or $CH_3$. It also is preferred that each R is a $C_1$-$C_{18}$ alkyl or branched alkyl. The silyl amine treating agent can comprise one or more of the above organosilicon compounds. Preferred silyl amine treating agents include but are not limited to vinyldimethylsilylamine; octyldimethylsilylamine, phenyldimethylsilylamine, bis (dimethylaminodimethylsilyl)-ethane, hexamethyldisilazane, bis(trifluoropropyl)tetramethyl-disilazane (F—HMDZ), and mixtures thereof.

The silyl amine treating agent also can comprise, in addition to or instead of the above compounds, one or more cyclic silazanes having the general formula

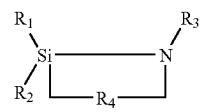

wherein $R_1$ and $R_2$ are independently selected from the group consisting of hydrogen, halogen, alkyl, alkoxy, aryl, and aryloxy; $R_3$ is selected from the group consisting of hydrogen, $(CH_2)_n CH_3$, wherein n is an integer between 0 and 3, $C(O)(CH_2)_n CH_3$, wherein n is an integer between 0 and 3, $C(O)NH_2$, $C(O)NH(CH_2)_n CH_3$, wherein n is an integer between 0 and 3, and $C(O)N[(CH_2)_n CH_3](CH_2)_m CH_3$, wherein n and m are integers between 0 and 3; and $R_4$ is $[(CH_2)_a (CHX)_b,$ (CYZ)$_c$], wherein X, Y and Z are independently selected from the group consisting of hydrogen, halogen, alkyl, alkoxy, aryl, and aryloxy, and a, b, and c are integers of 0 to 6 satisfying the condition that (a+b+c) equals an integer of 2 to 6. Suitable cyclic silazanes, and methods of preparing cyclic silazanes, are described in U.S. Pat. No. 5,989,768.

Without wishing to be bound by any particular theory, it is believed that the silylating agent reacts with the silanol groups on the surface of the silica particles according to the following general reaction:

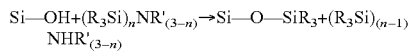

If n is greater than 1, the silyl amine treating agent is capable of transferring more than one silyl group per molecule of treating agent.

The amount of silyl amine treating agent used in the inventive method is based on the BET surface area of the silica particles used. The amount of the silyl amine treating agent is, therefore, expressed in terms of μmole of treating agent per square meter ($m^2$) of surface area of the hydrophilic silica particles used (based on the BET surface area of the silica particles), which is abbreviated for the purposes of this invention as "μmole/$m^2$." According to the method of the invention, about 3 μmole/$m^2$ or more (e.g., about 5 μmole/$m^2$ or more) of the silyl amine treating agent should be used. However, more of the treating agent can be used to ensure more complete contact and treatment of the silica particles with the treating agent. Thus, about 9 μmole/$m^2$ or more (e.g., about 12 μmole/$m^2$ or more) or even about 30 μmole/$m^2$ or more (e.g., about 36 μmole/$m^2$ or more) of the treating agent can be used. Although there is no theoretical limit on the amount of treating agent used, it is advisable to limit the amount of the treating agent in order to reduce the amount of organic impurities present in the treated silica particles, and to avoid costly waste of the treating agent. Thus, the amount of treating agent used will typically be about 75 μmole/$m^2$ or less (e.g., about 50 μmole/$m^2$ or less), such as about 36 μmole/$m^2$ or less (e.g., about 20 μmole/$m^2$ or less), or even about 9 μmole/$m^2$ or less (e.g., about 7 μmole/$m^2$ or less). Preferably, the amount of silyl amine treating agent used is within the range of about 3-75 μmole/$m^2$ (e.g., about 3-36 μmole/$m^2$), such as about 6-36 μmole/$m^2$ (e.g., about 6-18 μmole/$m^2$ or about 9-18 μmole/$m^2$). The concentration of silica in the dispersion also plays a role in the amount of treating agent needed. Lower concentrations call for larger amounts of treating agent, within the bounds described above.

The hydrophobicity of the silica particles prepared by the method of the invention depends, at least in part, upon the nature of the silyl amine treating agent used (e.g., the type of organosilicon functional groups provided by the silyl amine treating agent) and the degree of silylation of the surface silanol groups (e.g., the percentage of silanol groups that have reacted with the silyl amine treating agent). For example, treating agents comprising larger alkyl groups with more carbon atoms can provide a greater hydrophobic effect than smaller alkyl groups with fewer carbon atoms. Also, the degree of hydrophobicity of the silica particles increases with an increasing degree of silylation (i.e., an increasing percentage of silylated silanol groups). The extent to which the surface silanol groups are silylated depends, at least in part, on the type and amount of silyl amine treating agent used, the reaction time, the reaction temperature, and the reactivity of the particular silyl amine treating agent used. Due to steric crowding by the organosilicon functional group attached by the treating agent, not all of the surface silanol groups are available to react with a treating agent molecule. For example, when the organosilicon group is a trimethylsilyl group, the steric limit of available surface silanol groups is approximately 2.7 silanol groups per square nanometer of silica surface area (e.g., about 2.7 groups/$nm^2$ or about 4.5 μequiv/$m^2$). Hydrophobic silica particles prepared by the method of the invention preferably, but not necessarily, have a majority (e.g., about 50% or more, about 75% or more, or even about 85% or more), or substantially all (e.g., about 95% or more or even 99% or more) of the available silica surface silanol groups silylated. However, the preparation of hydrophobic silica particles having less than a majority (e.g., about 25% or more, or 35% or more) of the available silica surface silanol groups silylated also is contemplated.

The carbon content of the hydrophobic silica particles also can be used as an indicator of the level of treatment of the hydrophobic silica particles and, thus, as an indicator of the degree of hydrophobicity. Carbon content of the treated particles can be determined using commercially available carbon analyzers. The hydrophobic silica particles prepared in accordance with the invention desirably have a carbon content, after refluxing and extraction in a suitable washing solvent (e.g., acetone) for 30 minutes, of about 0.01% or more per square meter of silica surface area (%/$m^2$), preferably about 0.013%/$m^2$ or more, or even about 0.016%/$m^2$ or more (e.g., about 0.02%/$m^2$ or more).

The aqueous colloidal silica dispersion can comprise any suitable type of silica particles, provided that the silica particles have an average overall particle size of about 10-1000 nm. The term "overall particle size" as used herein refers to the size of an independent particle when dispersed in an aqueous dispersing medium (e.g., water). The overall particle size is separate and distinct from the primary particle size, the aggregate particle size, and the agglomerate particle size. Thus, the overall particle size of a given silica particle might be the same or different from its primary particle size, aggregate particle size, or agglomerate particle size. The average overall particle size, as defined herein, is the average overall particle size by volume as measured using dynamic light scattering (DLS). DLS can be performed using commercially available equipment (e.g., Microtrac® UPA 150 manufactured by Leeds and Northrup Co.). The silica particles can have an average overall particle size of about 20-800 nm (about 30-700 nm), such as about 40-600 nm (about 50-500 nm), or even about 60-400 nm (e.g., about 70-300 nm). Preferably, the silica particles have an average overall particle size of about 100 nm or more, such as about 100-350 nm (e.g., about 120-300 nm).

Suitable silica particles include wet-process type silica particles (e.g., condensation-polymerized silica particles such as silica gels and silica sols) made from any starting material including, but not limited to, chlorosilanes, alkoxysilanes, and sodium silicate. The colloidal silica dispersion also can comprise silica fume, mineral silica, or silica of a biological origin, (e.g., diatomite), as well as fumed or pyrogenic silica, which is typically produced by the vapor phase hydrolysis of a silica precursor, such as silicon tetrachloride, dichlorodimethylsilane, or octamethyl-cyclotetrasiloxane, in a hydrogen/oxygen flame (or as the by-product of such a process). In this process, submicron sized molten spheres of silica, known as primary particles, are formed. These particles collide and fuse to form three dimensional, branched, chain-like aggregates that are typically less than 1000 nm in spherical diameter. The aggregates can become loosely associated with one another to form agglomerates, which can easily exceed 1000 nm in spherical diameter. If dispersed with sufficient force (e.g., using high-shear mixers) the agglomerates can be broken down into aggregate particles.

The silica particles can have any suitable surface area. Fumed or pyrogenic silicas typically have surface areas of about 35-400 $m^2/g$, such as about 50-200 $m^2/g$. Wet-process silicas generally have lower surface areas. Preferably, the silica particles have a surface area of less than about 50 $m^2/g$, and more preferably less than about 35 $m^2/g$. The surface area of the silica particles can be measured by any suitable method known in the art. Typically, the surface area of the silica particles is determined by the method of S. Brunauer, P. H. Emmet, and I. Teller, *J. Am. Chemical Society*, 60, 309 (1938), which is commonly referred to as the BET method.

The term "colloidal dispersion" as used herein refers to a dispersion of colloidal particles (e.g., particles having an average overall particle size of about 1000 nm or less). The colloidal stability of such a dispersion prevents any substantial portion of the particles from irreversibly agglomerating. Agglomeration of particles can be detected by an increase in the average overall particle size. In this regard, the colloidal dispersion can be stabilized or non-stabilized. The term "stabilized" as used herein refers to the addition of a stabilizing ingredient, for example, an acid, base, or other stabilizing agent known in the art in an amount sufficient to increase the stability of the dispersion. Methods of stabilizing colloidal dispersions are known in the art. Whether stabilized or not, the colloidal dispersion used in conjunction with the invention preferably has a degree of colloidal stability such that the average overall particle size of the colloidal particle as measured by DLS does not change over a period of 3 weeks or more (e.g., 4 weeks or more, or even 5 weeks or more), more preferably 6 weeks or more (e.g., 7 weeks or more, or even 8 weeks or more), most preferably 10 weeks or more (e.g., 12 weeks or more, or even 16 weeks or more). Aqueous colloidal silica dispersions are commercially available, generally at a slightly basic pH (e.g., about 9-10), but are also available as neutral and acidic dispersions.

The amount of silica in the aqueous colloidal silica dispersion is about 5-70 wt. % based on the total weight of the dispersion. Typically, the amount of silica in the dispersion will be about 20 wt. % or more (e.g., about 25 wt. % or more) or even about 35 wt. % or more (e.g., about 40 wt. % or more). Thus, the amount of silica in the dispersion can be about 10-65 wt. % (e.g., about 15-60 wt %.) or about 20-50 wt. % (e.g., about 25-45 wt. %).

The aqueous colloidal silica dispersion and the silyl amine treating agent can be combined to provide a reaction mixture by any suitable method. Preferably, the silyl amine treating agent and the aqueous colloidal silica dispersion are combined with mixing or agitation to facilitate contact between the silica particles and the silyl amine treating agent. Mixing or agitation is especially important if the silyl amine treating agent is water-immiscible, in which case the reaction mixture will comprise an aqueous phase comprising the untreated colloidal silica particles, and a non-aqueous phase comprising the silyl amine treating agent. Mixing or agitation can be accomplished by any method, such as by using a mixing or agitating device. Examples of suitable devices include paddle stirrers, radial flow or axial flow impellers, homogenizers, ball mills, jet mills, and similar devices.

The reaction mixture can be maintained at any temperature that allows the silyl amine treating agent to react with aqueous colloidal silica dispersion (e.g., react with the silanol groups on the surface of the silica particles). Generally, the reaction mixture is maintained at a temperature of about 5-100° C., such as about 15-80° C., or about 20-50° C., for about 5 minutes or longer (e.g., about 30 minutes or longer), or even about 60 minutes or longer (e.g., about 120 minutes or longer, or about 180 minutes or longer). Longer reaction times (e.g., 5 hours or more, 10 hours or more, or even 20 hours or more) may be required depending on the particular reaction conditions (e.g., temperature and concentration of reagents) used.

The reaction mixture can be contained in an open or closed reactor. While the treatment can be done in air, oxygen is preferably excluded from the reaction atmosphere, in which case the reaction can be conducted under an atmosphere consisting essentially of nitrogen, argon, carbon dioxide, or a mixture thereof.

Without wishing to be bound by any particular theory, it is believed that ammonia or an amine can be produced as a by-product of the reaction between the silyl amine treating agent and the silanol groups on the silica particles, and that ammonia- or amine-catalyzed hydrolysis of the silica surface can occur as a result. This side reaction can be minimized by controlling the amount of the silyl amine treating agent used. Also, this side reaction can be controlled by passing carbon dioxide gas through the reaction mixture. The carbon dioxide can reduce the levels of liberated ammonia or amines by converting them into ammonium bicarbonate or amine bicarbonate salts, which are unable to react with the silica surface at an appreciable rate. The ammonium bicarbonate or amine bicarbonate salts can be removed from the mixture during or after the completion of the reaction by known methods. Alternatively, to the extent it may be advantageous to do so in any given application, additional ammonia can be added to the reaction mixture to increase the amount of ammonia in solution.

In order to facilitate the reaction between the silyl amine treating agent and the aqueous colloidal silica dispersion, the reaction mixture should have a pH of about 7 or more (e.g., about 8 or more), such as about 9 or more (e.g., about 10 or more). Preferably the pH is about 7-11(e.g., about 9-11). The pH of the dispersion may be altered by the addition of acids, bases, or buffers. These include materials that may react in situ to release acidic or basic substances. For example, trimethylchlorosilane may be added to the reaction mixture to lower the pH by the evolution hydrochloric acid. Likewise, a buffering salt such as ammonium bicarbonate may be added to maintain the pH at a different level.

The reaction mixture comprises no more than about 50 wt. % of an organic solvent, and preferably comprises no more than about 20 wt. % of an organic solvent. More preferably, the reaction mixture comprises no more than about 15 wt. % (e.g., no more than about 10 wt. %) or no more than about 5 wt. % (e.g., no more than about 1 wt. %) of an organic solvent. Desirably, the reaction mixture is free of an organic solvent. According to one aspect of the invention, the reaction mixture consists essentially of the aqueous colloidal silica dispersion and the silyl amine treating agent, along with any reaction by-products that might be present. Within these guidelines, however, a small amount of an organic solvent can be used. Suitable organic solvents include water-immiscible and water-miscible organic solvents, preferably in which the silyl treating amine agent is at least partially soluble. Non-limiting examples of suitable water-immiscible organic solvents include dichloromethane, dichloroethane, tetrachloroethane, benzene, toluene, heptane, octane, cyclohexane, and similar solvents. Non-limiting examples of water-miscible organic solvents include alcohols (e.g., methanol, ethanol, isopropanol, etc.), tetrahydrofuran, acetone, and similar solvents.

The hydrophobic silica particles can be isolated and dried from the reaction mixture. The terms "dry" and "dried" as used herein with reference to the hydrophobic silica particles means substantially or completely free of the liquid components of the reaction mixture, including water and other liquid-phase solvents, reactants, by-products, and any other liquid component that might be present. Similarly, the term "drying" as used herein refers to the process of removing the liquid components of the reaction mixture from the hydrophobic silica particles.

The hydrophobic silica particles can be isolated from the reaction mixture prior to drying, or the hydrophobic silica particles can be dried directly from the reaction mixture. Any suitable method can be used to isolate the hydrophobic silica particles from the reaction mixture. Suitable methods include filtration and centrifugation.

The hydrophobic silica particles can be dried after isolation from the reaction mixture, or directly from the reaction mixture, by evaporating the volatile components of the reaction mixture from the hydrophobic silica particles. Evaporation of the volatile components of the reaction mixture can be accomplished using heat-and/or reduced atmospheric pressure. When heat is used, the hydrophobic silica particles can be heated to any suitable drying temperature, for example, using an oven or other similar device. The drying temperature chosen will depend, at least in part, on the specific components of the reaction mixture that require evaporation. Typically, the drying temperature will be about 40° C. or higher (e.g., about 50° C. or higher) such as about 70° C. or higher (e.g., about 80° C. or higher) or even about 120° C. or higher (e.g., about 130° C. or higher). Thus, the drying temperatures fall generally within the range of about 40-250° C. (e.g., about 50-200° C.), such as about 60-200° C. (e.g., about 70-175° C.), or about 80-150° C. (e.g., about 90-130° C.).

The hydrophobic silica particles can be dried at any pressure that will provide a useful rate of evaporation. When drying temperatures of about 120° C. and higher (e.g., about 120-150° C.) are used, drying pressures of about 125 kPa or less (e.g., about 75-125 kPa) are suitable. At drying temperatures lower than about 120° C. (e.g., about 40-120° C.), drying pressures of about 100 kPa or less (e.g., about 75 kPa or less) are useful. Of course, reduced pressure (e.g., pressures of about 100 kPa or less, 75 kPa or less, or even 50 kPa or less) can be used as a sole method for evaporating the volatile components of the reaction mixture.

The hydrophobic silica particles also can be dried by other methods. For example, spray drying can be used to dry the hydrophobic silica particles. Spray drying involves spraying the reaction mixture, or some portion thereof, comprising the hydrophobic silica particles as a fine mist into a drying chamber, wherein the fine mist is contacted with hot air causing the evaporation of volatile components of the reaction mixture. Alternatively, the hydrophobic silica particles can be dried by lyophilization, wherein the liquid components of the reaction mixture are converted to a solid phase (i.e., frozen) and then to a gas phase by the application of a vacuum. For example, the reaction mixture comprising the hydrophobic silica particles can be brought to a suitable temperature (e.g., about −20° C. or less, or about −10° C. or less, or even −5° C. or less) to freeze the liquid components of the reaction mixture, and a vacuum can be applied to evaporate those components of the reaction mixture to provide dry hydrophobic silica particles.

The hydrophobic silica particles can be neutralized prior to drying by addition of an acid, such as a mineral acid (e.g., HCl or $HNO_3$), an organic acid, or gas-acid (e.g., $CO_2$) to the silica before or after isolation from the reaction medium. The neutralization of the hydrophobic silica prior to drying desirably enables the production of a dry powder product that has a neutral pH (as measured when dispersed in a solution).

The hydrophobic silica particles can be washed prior to or after isolation and/or drying from the reaction mixture. Washing the hydrophobic silica particles can be performed using a suitable washing solvent, such as water, a water-miscible organic solvent, a water-immiscible solvent, or a mixture thereof. The washing solvent can be added to the reaction mixture and the resulting mixture suitably mixed, followed by filtration, centrifugation, or drying to isolate the washed hydrophobic silica particles. Alternatively, the hydrophobic silica particles can be isolated from the reaction mixture prior to washing. The washed hydrophobic silica particles can be further washed with additional washing steps followed by additional filtration, centrifugation, and/or drying steps.

The hydrophobic silica particles have an overall particle size that is dependent, at least in part, on the overall particle size of the silica used in the initial dispersion. Preferably, the average overall particle size of the hydrophobic silica particles is about five times or less, more preferably about two times or less, the average overall particle size of the silica used in the initial dispersion. When even smaller particles are desired, the average overall particle size of the hydrophobic silica particles is desirably about 175% or less, such as about 150% or less or even 125% or-less, of the average overall particle size of the silica particles used in the initial dispersion. The average overall particle size of the hydrophobic silica particles can be determined by the method described in Example 1. The particle size of the hydrophobic silica particles can be further reduced, if desired. Suitable processes for the reduction of the particle size of the hydrophobic silica particles include but are not limited to wet or dry grinding, hammer milling, and jet milling.

The hydrophobic silica particles can be used for many different applications including but not limited to toners compositions, antiblocking agents, adhesion modifiers, polymer additives (e.g., for elastomers and rubbers, such as silicone rubbers), abrasion-resistant coatings and films, delustering coatings and films, reological control agents (e.g., for epoxies or liquid polymers), and mechanical/optical control agents (e.g., for composites and plastics). The hydrophobic silica particles are especially useful in toner compositions. In that regard, the invention provides a method for preparing a toner composition, as well as a method of preparing a polymer composition, which methods comprise preparing hydrophobic silica particles according to the methods described herein and (b) combining the hydrophobic silica particles with toner particles or a polymer to provide a toner composition or polymer composition, respectively.

Thus, the method of preparing a toner composition comprises (a) providing an aqueous colloidal silica dispersion comprising about 5-70 wt. % of hydrophilic silica particles, wherein the hydrophilic silica particles have an average overall particle size of about 10-1000 nm, (b) combining the dispersion with about 3-75 µmole/m$^2$ (based on the BET surface area of the hydrophilic silica particles) of a silyl amine treating agent to provide a reaction mixture, wherein the reaction mixture has a pH of about 7 or more and comprises no more than about 50 wt. % of an organic solvent, (c) drying the dispersion to provide hydrophobic silica particles and (d) combining the hydrophobic silica particles with toner particles to provide a toner composition. Any suitable toner particles can be used in accordance with this method. The method of preparing toner compositions may further comprise the addition of other components such as binders, resins, colorants, or other metal oxide particles. The other aspects of the method for preparing a toner composition according to the invention are as described with respect to the method of preparing hydrophobic silica particles of the invention.

Similarly, the method of preparing a polymer composition comprises (a) providing an aqueous colloidal silica dispersion comprising about 5-70 wt. % of hydrophilic silica particles, wherein the hydrophilic silica particles have an average overall particle size of about 10-1000 nm, (b) combining the dispersion with about 3-75 µmole/m$^2$ (based on the BET surface area of the hydrophilic silica particles) of a silyl amine treating agent to provide a reaction mixture, wherein the reaction mixture has a pH of about 7 or more and comprises no more than about 50 wt. % of an organic solvent, (c) drying the dispersion to provide hydrophobic silica particles and (d) combining the hydrophobic silica particles with a polymer to provide a polymer composition. The method of preparing a polymer composition can be used with any suitable polymer to provide any type of polymer composition, such as an epoxy, coating composition, film forming composition, or plastic composition.

The following examples further illustrate the invention but, of course, should not be construed as in any way limiting its scope.

EXAMPLES

In each of the following examples, reactions were conducted in a 500 mL 3-necked flask fitted with an overhead agitator and 0.6 cm (0.25 inch) thermocouple, unless otherwise noted. The carbon content of the hydrophobic silica particles was used as a measure of the extent of silylation of surface silanol groups. Carbon content was measured using a model C-200 Carbon Analyzer instrument (LECO Corp.). Particle sizes were determined by dynamic light scattering using a Microtrac® UPA 150 instrument (Leeds and Northrup Co.). The following hydrophilic colloidal silica dispersions used in the examples: MP 1040 (Nissan Chemical), PL 13 (Fuso Chemical), and Snowtex® ZL (Nissan Chemical).

Example 1

The following example illustrates the preparation of hydrophobic silica particles by treating a hydrophilic colloidal silica dispersion with a treating agent, in accordance with the invention.

Hydrophobic silica particle samples 1A-3A were prepared from the commercially available hydrophilic colloidal silica dispersions indicated in Table 1. Hexamethyldisilazane [HMDZ] was added directly to each of the hydrophilic colloidal silica dispersions in a 2 liter 3-necked flask fitted with an overhead agitator and 0.6 cm (0.25 inch) thermocouple, and the mixtures were stirred rapidly at room temperature (19-21° C.) at a rate such that the vortex of the dispersion extended at least to the top of the agitator blade. Stirring at this rate was continued for the duration of the reaction time, which was between 20 and 24 hours. Table 1 provides the specific reaction times and the amount of silica dispersion and HMDZ used in preparing each sample. Intermediate samples were removed from each reaction mixture at various times, dried on a moisture balance at 160° C., and tested for carbon content. These results are provided in Table 3.

After allowing the dispersions to react for the time specified in Table 1, each dispersion was poured into a Pyrex dish and dried in a forced-air oven at 128-135° C. The final products were tested for carbon content and BET surface area. The particle size of the silica dispersions was measured by dynamic light scattering before and after treatment. The after-treatment silica particles were ground in a mortar and dispersed in tetrahydrofuran by ultrasound for 5-10 minutes prior to measuring the particle size. The results of the testing are provided in Tables 1 and 2.

TABLE 1

| Sample | Hydrophilic Silica Dispersion | | HMDZ (g) | Reaction Time (hours) | Carbon Content (%) | BET (m$^2$/g) |
| --- | --- | --- | --- | --- | --- | --- |
| | Type | Amount (g) | | | | |
| 1A | MP 1040, 40% solids | 999 | 35 | 21.5 | 0.67 | 31 |
| 1B | MP 2040, 27% solids | 798 | 17 | 24 | 0.22 | 17 |
| 1C | PL 13, 36% solids | 1087 | 21 | 23 | 0.29 | 18 |

TABLE 2

| Sample | Average Particle Size (by volume) Before Treatment (nm) | Average Particle Size (by volume) After Treatment (nm) |
| --- | --- | --- |
| 1A | 141 | 148 |
| 1B | 233 | 257 |
| 1C | 212 | 288 |

TABLE 3

| Sample | Reaction Time (hours)/ Percent (%) Carbon | | |
| --- | --- | --- | --- |
| 1A | 2.75/0.04 | 4.75/0.21 | 20.5/0.59 |
| 1B | 4/0.09 | 6.25/0.19 | 22.75/0.23 |
| 1C | 2.5/0.18 | 5.75/0.22 | 21.5/0.29 |

The percent carbon content measurements provided in Table 1 indicate that the silica particles in each of samples 1A-1C contained sufficient hydrophobic groups to render the silica particles hydrophobic. The percent carbon content measurements of the intermediate samples in Table 3 show that the level of treatment increases with reaction time. The similar average particle size of the hydrophobic (post-treatment) silica particles as compared to the particle size of the silica particles before treatment (Table 2) shows that no significant agglomeration of the colloidal particles occurred during or after treatment. These results demonstrate that hydrophobic silica particles can be prepared directly from commercially available dispersions in accordance with the invention.

Example 2

The following example illustrates the preparation of hydrophobic silica particles by treating a hydrophilic colloidal silica dispersion with HMDZ and subsequently isolating and washing the hydrophobic silica particles, in accordance with the invention.

Hydrophobic silica particle samples 2A and 2B were prepared from the commercially available hydrophilic colloidal silica dispersions indicated in Table 4. HMDZ was added directly to each hydrophilic colloidal silica dispersion in a 100 mL round bottomed flask fitted with a magnetic stir bar, and the mixtures were stirred rapidly at room temperature (19-21° C.) at a rate such that the vortex of the dispersion extended at least to the top of the stir bar. Stirring at this rate was continued for the duration of the reaction time specified in Table 4. Table 4 provides the amount of silica dispersion and HMDZ used in preparing each sample.

After allowing the dispersions to react for the specified time, each dispersion was poured into a glass dish and dried in a forced air oven at 128-135° C., and the final products were tested for carbon content. A sample of each dried product was washed by refluxing in toluene for 30 minutes, isolating the silica particles by filtration, and washing again with fresh toluene. The washed samples were dried under vacuum at 60-70° C. for 18 hours, and subsequently tested for carbon content. The results are presented in Table 4.

TABLE 4

| Sample | Hydrophilic Silica Dispersion Type | Amount (g) | HMDZ (g) | Temp. (° C.) | Reaction Time (hours) | Carbon Content (%) Before Wash | Carbon Content (%) After Wash |
| --- | --- | --- | --- | --- | --- | --- | --- |
| 2A | MP-1040, 40% solids | 50 g | 3.5 g | 20–23 | 20 | 0.90 | 0.57 |
| 2B | MP-1040, 40% solids | 50 g | 1.8 g | 20–23 | 20 | 0.65 | 0.61 |

The reduced carbon content in the washed samples is the result of removing non-volatile treatment by-products from the surface of the silica particles. These results show that washing the samples can decrease the level of organic impurities in the samples without significantly affecting the hydrophobic nature of the silica particles.

The results further show that washing sample 2A reduced the carbon content of the sample by about 34%, whereas washing sample 2B reduced the carbon content of the sample by only about 7%. This illustrates that a greater excess of HMDZ was used in preparing sample 2A. By reducing the amount of HMDZ used, the level of organic impurities in the hydrophobic silica product can be reduced.

Example 3

The following example illustrates the effect of reaction time and temperature on the preparation of hydrophobic silica particles in accordance with the invention.

Hydrophobic silica particle samples 3A-3C were prepared from the commercially available hydrophilic colloidal silica dispersions indicated in Table 5. HMDZ was added directly to each hydrophilic colloidal silica dispersion, and the mixtures were stirred rapidly at room temperature (19-21° C.) at a rate such that the vortex of the dispersion extended at least to the top of the agitator blade. Stirring at this rate was continued for the duration of the reaction time specified in Table 5. Table 5 provides the amount of silica dispersion and HMDZ used in preparing each sample. Intermediate samples were removed from the reaction at various times, dried on a moisture balance at 160° C., and analyzed for carbon content. These results are provided in Table 6.

After allowing the dispersions to react for the specified time, each dispersion was poured into a glass dish and dried in a forced air oven at 128-135° C., and the final products were tested for carbon content. A sample of each dried product was washed by refluxing in acetone for 30-60 minutes, isolating the silica particles by filtration, and washing again with fresh acetone. The washed samples were dried under vacuum at 60-70° C. for 18 hours, and subsequently tested for carbon content. The results are presented in Table 5.

TABLE 5

| Sample | Hydrophilic Silica Dispersion Type | Amount (g) | HMDZ (g) | Temp (° C.) | Reaction Time (hours) | Carbon Content (%) Before Wash | Carbon Content (%) After Wash |
| --- | --- | --- | --- | --- | --- | --- | --- |
| 3A | Snowtex ® ZL, 40% solids | 200 g | 7 | 20-23 | 23 | 0.62 | 0.54 |
| 3B | Snowtex ® ZL, 40% solids | 200 g | 7 | 42-48 | 8.5 | 0.99 | 0.62 |
| 3C | Snowtex ® ZL, 40% solids | 100 g | 1.8 | 45 | 8.5 | 0.42 | 0.39 |

TABLE 6

| Sample | Reaction Time (hours)/Percent (%) Carbon | | | |
|---|---|---|---|---|
| 3A | 0.83/0.07 | 3/0.39 | 4.75/0.32 | 7/0.46 |
| 3B | 1/0.38 | 2.5/0.64 | 4/0.85 | 8.5/0.99 |
| 3C | 1/0.12 | 2.5/0.26 | 4/0.33 | 8.5/0.42 |

Comparison of the carbon content of samples 3A and 3B shows that a higher degree of treatment can be achieved in a shorter amount of time using increased reaction temperatures. At the increased reaction temperature and reduced reaction time, the concentration of treating agent can be reduced while maintaining an acceptable level of treatment (sample 3C).

Example 4

The following example illustrates the effect of using water-miscible organic solvents in combination with the method of the invention.

Hydrophobic silica particle samples 4A and 4B were prepared from a commercially available hydrophilic colloidal silica dispersion (Snowtex® ZL, 40% solids) by adding 3.5 g HMDZ and 16.8 wt. % isopropanol (IPA) (4A) or 16.8 wt. % tetrahydrofuran (THF) (4B) directly to 100 g of the hydrophilic colloidal silica dispersion, and stirring rapidly at room temperature (19-21° C.) at a rate such that the vortex of the dispersion extended at least to the top of the agitator blade. Stirring at this rate was continued for the duration of the reaction time, which was 22 hours.

After allowing the dispersion to react for the specified time, the dispersion was poured into a glass dish and dried in a forced air oven at 128-135° C. The carbon content of the final products is shown in Table 7.

Samples 4A and 4B were prepared in the same manner as sample 3A (Example 3), except that the reaction mixture used to prepare samples 4A and 4B included a cosolvent. A comparison of the carbon content of sample 4A with the carbon content of sample 3A demonstrates that the inclusion of 16.8 wt. % isopropanol as a cosolvent resulted in a significant decrease in the treatment level. Inclusion of 16.8 wt. % tetrahydrofuran as a cosolvent in sample 4B resulted in a higher carbon content as compared to sample 4A, containing the isopropanol, but still resulted in a decrease in carbon content over sample 3A, which contained no organic cosolvent.

Example 5

The following example illustrates the effect of pH on the preparation of hydrophobic silica particles in accordance with the invention.

Hydrophobic silica particle samples 5A and 5B were prepared from the commercially available hydrophilic silica dispersions indicated in Table 8. HMDZ was added directly to each hydrophilic colloidal silica dispersion, and the pH of sample 5A was adjusted to about 7.5 by addition of 10 wt. % hydrochloric acid (the pH of sample 5B was not adjusted). The mixtures were stirred rapidly at room temperature (19-21° C.) at a rate such that the vortex of the dispersion extended at least to the top of the agitator blade. Stirring at this rate was continued for duration of the reaction time specified in Table 8. The amounts of the silica dispersions and HMDZ used are provided in Table 8.

After allowing the dispersions to react for the time specified in Table 8, the pH value of each dispersion was tested. Then, each dispersion was poured into a glass dish and dried in a forced air oven at 128-135° C., and the final products were tested for carbon content. The pH values of the dispersions at the end of the reaction times and the carbon content of the final products are provided in Table 8.

TABLE 7

| | Hydrophilic Silica Dispersion | | HMDZ | Co-Solvent | | Temp | Reaction Time | Carbon Content |
|---|---|---|---|---|---|---|---|---|
| Sample | Type | Amount (g) | (g) | Type, | Amount (g) | (° C.) | (hours) | (%) |
| 4A | Snowtex® ZL, 40% solids | 100 | 3.5 | IPA, | 20 | 23-26 | 22 | 0.23 |
| 4B | Snowtex® ZL, 40% solids | 200 | 7 | THF, | 40 | 20-23 | 22 | 0.44 |

TABLE 8

| | Hydrophilic Silica Dispersion | | HMDZ | Temp | Reaction Time | pH | Carbon Content |
|---|---|---|---|---|---|---|---|
| Sample | Type | Amount (g) | (g) | (° C.) | (hours) | | (%) |
| 5A | Snowtex® ZL, 40% solids | 200 g | 7 | 23 | 8.5 | 7.5 | 0.23 |
| 5B | Snowtex® ZL, 40% solids | 200 g | 7 | 20-23 | 7 | 10.8 | 0.46 |

Comparison of the carbon content of sample 5A (lower pH) with sample 5B (higher pH) indicates that the method of preparing hydrophobic silica particles of the invention is more effective at higher pH values.

Example 6

The following example illustrates the effect of excess ammonia on the preparation of hydrophobic silica particles in accordance with the invention.

Hydrophobic silica particle sample 6 was prepared from a commercially available hydrophilic colloidal silica dispersion (MP-1040, 40% solids) by adding 0.64 g of aqueous ammonia (28%) to 50.5 g of the hydrophilic colloidal silica dispersion in a 100 mL 3-necked flask fitted with a magnetic stir bar and thermometer, followed by the addition of 3.5 g of HMDZ. The mixture was stirred at room temperature (19-21° C.) at a rate such that the vortex of the dispersion extended at least to the top of the agitator blade. Stirring at this rate was continued for the duration of the reaction time, which was 20 hours.

After allowing the dispersion to react for the specified time, the dispersion was poured into a glass dish and dried in a forced air oven at 128-135° C. The final product had a carbon content of 0.28%.

Comparison of the carbon content of sample 6 with that of sample 2A (Example 2), which was prepared in a similar manner without the addition of ammonia, indicates that the method of the invention can be conducted in the presence of excess ammonia, but results in a lower level of treatment under a given set of conditions.

Example 7

The following example illustrates the effect of pH-adjusting additives on the preparation of hydrophobic silica particles in accordance with the invention.

Hydrophobic silica particle samples 7A-7D were prepared from the commercially available hydrophilic silica dispersions indicated in Table 9. HMDZ and either ammonium bicarbonate ($NH_4HCO_3$) or trimethylchlorosilane (TMCS) as a pH-adjusting additive were added directly to each hydrophilic colloidal silica dispersion (except for sample 7D, which did not contain a pH adjusting additive). The mixtures were stirred rapidly at room temperature (20-23° C.) at a rate such that the vortex of the dispersion extended at least to the top of the agitator blade. Stirring at this rate was continued for the time specified in Table 9. The amounts of the silica dispersions, pH-adjusting additives, and HMDZ used are provided in Table 9.

After allowing the dispersions to react for the specified time, the pH of the dispersions was measured, as provided in Table 9. The dispersions were then poured into a glass dish and dried in a forced air oven at 128-135° C. The carbon content of the final products is provided in Table 9.

TABLE 9

| Sample | Hydrophilic Silica Dispersion Type | Amount (g) | HMDZ (g) | pH-Adjusting Additive, Amount | pH | Reaction Time | Carbon Content (%) |
|---|---|---|---|---|---|---|---|
| 7A | Snowtex ® ZL, 40% solids | 100 | 1.8 | TMCS, 0.245 mL | 10.2 | 24 | 0.41 |
| 7B | Snowtex ® ZL, 40% solids | 100 | 1.8 | $NH_4HCO_3$, 0.608 g | 9.7 | 24 | 0.36 |
| 7C | Snowtex ® ZL, 40% solids | 100 | 1.8 | $NH_4HCO_3$, 0.304 g | 9.9 | 24 | 0.41 |
| 7D | Snowtex ® ZL, 40% solids | 200 | 3.5 | none | 10.7 | 23.5 | 0.43 |

These results show that the treatment process is effective in the presence of additives that moderately lower the pH of the reaction mixture. However, significantly lower pH values tend to reduce the treatment level (Example 5).

Example 8

The following example illustrates the preparation of hydrophobic silica particles by treating a hydrophilic colloidal dispersion of silica with a treating agent and subsequently isolating and washing the silica, in accordance with the invention.

Hydrophobic silica particle samples 8A and 8B were prepared from the commercially available hydrophilic colloidal silica dispersions indicated in Table 10. bis(trifluoropropyl)tetramethyl-disilazane (F-HMDZ) was added directly to the hydrophilic colloidal silica dispersion in a 250 ml 3-necked round flask fitted with an overhead agitator, cooling water condenser, and thermocouple. The mixture was stirred at 460 RPM and heated to 100IC. Stirring continued at 100° C. for the duration of the reaction time, which is specified in Table 10. Table 10 also provides the amount of the silica dispersion and F-HMDZ used in preparing each sample.

After allowing the dispersions to react for the specified time, each dispersion was filtered and twice washed with DI water. The wet samples were then poured into a glass dish and dried in a forced-air oven at 130° C. The final products were tested for carbon content. A sample of each dried product was extracted with toluene for 3 hours and then dried under vacuum at 90-100° C. for 18 hours and subsequently tested for carbon content. The results are presented in Table 10.

TABLE 10

| Sample | Hydrophilic Silica Dispersion Type | Amount (g) | F-HMDZ (g) | Temp. (°C.) | Reaction time (hours) | Carbon Content (%) Before Extraction | Carbon Content (%) After Extraction |
|---|---|---|---|---|---|---|---|
| 8A | MP-1040 40% solids | 50 | 3.5 | 100 | 2 | 2.81 | 0.694 |
| 8B | MP-1040 40% solids | 100 | 3.5 | 100 | 2 | 1.65 | 0.786 |

The reduced carbon content in the toluene extracted samples is the result of removing non-volatile treatment by-products and unreacted F-HMDZ from the surface of the silica particles. These results demonstrate that washing the samples can decrease the level of organic impurities in the samples without significantly affecting the hydrophobic nature of the silica particles.

Example 9

The following example illustrates the effect of homogenization and spray drying on the preparation of hydrophobic silica in accordance with the invention.

Hydrophobic silica particles (samples 9A and 9B) were prepared from commercially available hydrophilic colloidal silica dispersions listed in Table 11. The colloidal silica dispersions were added to a reactor and diluted with deionized water to provide the silica concentrations indicated in Table 11. HMDZ was added to the diluted dispersions in the indicated amounts. Sample 9A was recycled at 50° C. through an in-line homogenizer to facilitate vigorous mixing of the dispersion with the HMDZ. Sample 9B also was recycled at 50° C., but was not homogenized. Both samples were spray dried. The carbon content of the dried samples is provided in Table 11.

TABLE 11

| Sample | Hydrophilic Silica Dispersion Type | Amount (kg) | Diluted Conc. | HMDZ (kg) | Homogenized | Carbon Content (%) |
|---|---|---|---|---|---|---|
| 9A | MP-1040, 40% solids | 40 | 21 | 3.2 | yes | 0.98 |
| 9B | MP-1040, 40% solids | 41 | 21 | 3.5 | no | 0.84 |

Comparison of the carbon content of sample 9A with that of sample 9B shows that the use of homogenization results in an increased treatment level. Spray drying produced a fine powder directly in the drying step.

Example 10

The following example illustrates the effect of neutralization of hydrophobic silica prepared in accordance with the invention.

Hydrophobic silica particles were prepared from a commercially available hydrophilic colloidal silica dispersion (Snowtex XL), which was diluted to 32 wt. % silica with deionized water. 2.9 kg of HMDZ was added to the diluted dispersion. The mixture was heated to 50° C. and recycled through an in-line homogenizer for 24 hours to facilitate vigorous mixing of the silica dispersion with the HMDZ. One half of the treated particle dispersion was spray dried after treatment (sample 10A). The second half of the dispersion was neutralized by adding dilute aqueous HCl to the solution prior to spray drying (sample 10). The dried particles were re-dispersed in a mixture of isopropyl alcohol and water, and the pH of the particles was measured using a pH probe.

Sample 10A had a carbon content of about 1.16 and a pH of about 10.6, whereas sample 10B had a carbon content of about 0.97 and a pH of about 7.7. These results show that neutralization of the treated silica solution prior to drying results in a product with a neutral pH, although with a slight loss in treatment level.

Comparative Example 11

The following example illustrates the treatment of a colloidal silica dispersion with hexamethyldisiloxane (HMDS) and ammonia instead of a silyl amine treating agent, not in accordance with the invention.

A hydrophobic colloidal silica dispersion (sample 11) was prepared from a commercially available hydrophilic silica dispersion (Snowtex® ZL, 40% solids) by adding 1.5 g of aqueous ammonia (10%) and 7 g of HMDS to 200 g of the hydrophilic silica dispersion. The mixture was stirred at room temperature (22-23° C.) at a rate such that the vortex of the dispersion extended at least to the top of the agitator blade. Stirring at this rate was continued for 24 hours.

After allowing the dispersion to react for the specified time, the dispersion was poured into a glass dish and dried in a forced air oven at 128-135° C. The final product had a carbon content of 0.03%.

Sample 11 was prepared in the same manner as sample 3A (Example 3), except that the HMDZ used in sample 3A was replaced with an equivalent amount of HMDS and ammonia. A comparison of the carbon content of sample 8 (0.03%) with that of sample 3A (0.54% after washing) indicates that hexamethyldisiloxane and ammonia are not effective at treating colloidal silica in accordance with the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of preparing hydrophobic silica particles comprising
   (a) providing an aqueous colloidal silica dispersion comprising about 5-70 wt. % of hydrophilic silica particles, wherein the hydrophilic silica particles have an average overall particle size of about 10-1000 nm,
   (b) combining the dispersion with about 3-75 μmole/m² (based on the BET surface area of the hydrophilic silica particles) of a silyl amine treating agent to provide a reaction mixture, wherein the reaction mixture has a pH of about 9 or more and comprises no more than about 50 wt. % of an organic solvent, and
   (c) drying the hydrophobic silica particles directly from the reaction mixture.

2. The method of claim 1, wherein the dispersion comprises about 15-60 wt. % silica particles.

3. The method of claim 2, wherein the dispersion comprises about 20-50 wt. % silica particles.

4. The method of claim 1, wherein the reaction mixture is maintained at a temperature of about 5-100° C. for about 5 minutes or longer.

5. The method of claim 4, wherein the reaction mixture is maintained at a temperature of about 15-50° C. for about 5 minutes or longer.

6. The method of claim 1, wherein the silyl amine treating agent is water-immiscible.

7. The method of claim 1, wherein the silyl amine treating agent has the general formula $(R_3Si)_nNR'_{(3-n)}$ wherein
   n is 1-3;
   each R is independently selected from the group consisting of hydrogen, a $C_1$-$C_{18}$ alkyl or branched alkyl, a $C_3$-$C_{18}$ haloalkyl, vinyl, a $C_6$-$C_{14}$ aromatic group, a $C_2$-$C_{18}$ alkenyl group, a $C_3$-$C_{18}$ epoxyalkyl group, and linear or branched $C_mH_{2m}X$, wherein m is 1-18;
   each R' is independently hydrogen, $C_1$-$C_{18}$ alkyl or branched alkyl, or when n=1, a $C_2$-$C_6$ cyclic alkylene;

X is $NR''_2$, SH, OH, $OC(O)CR''{=}CR''_2$, $CO_2R''_2$, or CN; and
R" is independently hydrogen, a $C_1$-$C_{18}$ alkyl or branched alkyl, a $C_2$-$C_{18}$ unsaturated group, a $C_1$-$C_{18}$ acyl or $C_3$-$C_{18}$ unsaturated acyl group, a $C_2$-$C_6$ cyclic alkylene or a $C_6$-$C_{18}$ aromatic group.

8. The method of claim 7, wherein each R' is hydrogen.

9. The method of claim 1, wherein the silyl amine treating agent is a bisaminodisilane.

10. The method of claim 1, wherein the silyl amine treating agent is bis(trifluoropropyl)tetramethyl-disilazane (F-HMDZ).

11. The method of claim 1, wherein the silyl amine treating agent is hexamethyldisilazane.

12. The method of claim 1, wherein the silyl amine treating agent is a silazane having the formula

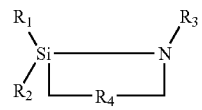

wherein $R_1$ and $R_2$ are independently selected from the group consisting of hydrogen, halogen, alkyl, alkoxy, aryl, and aryloxy;
$R_3$ is selected from the group consisting of hydrogen, $(CH_2)_nCH_3$, wherein n is an integer between 0 and 3, $C(O)(CH_2)_nCH_3$, wherein n is an integer between 0 and 3, $C(O)NH_2$, $C(O)NH(CH_2)_nCH_3$, wherein n is an integer between 0 and 3, and $C(O)N[(CH_2)_nCH_3](CH_2)_mCH_3$, wherein n and m are integers between 0 and 3; and
$R_4$ is $[(CH_2)_a(CHX)_b(CYZ)_c]$, wherein X, Y and Z are independently selected from the group consisting of hydrogen, halogen, alkyl, alkoxy, aryl, and aryloxy, and a, b, and c are integers of 0 to 6 satisfying the condition that (a+b+c) equals an integer of 2 to 6.

13. The method of claim 1, wherein the hydrophobic silica is dried at 40-250° C.

14. The method of claim 13, wherein the hydrophobic silica is dried at 80-150° C.

15. The method of claim 1, wherein the hydrophobic silica is dried by lyophilization.

16. The method of claim 1, wherein the hydrophobic silica is dried at a pressure of about 100 kPa or less.

17. The method of claim 1, wherein the hydrophobic silica is spray-dried.

18. The method of claim 1, further comprising isolating the hydrophobic silica particles by filtration or centrifugation.

19. The method of claim 1, further comprising reducing the overall particle size of the hydrophobic silica particles.

20. The method of claim 19, wherein the overall particle size of the hydrophobic silica particles is reduced by grinding, hammer milling, or jet milling.

21. The method of claim 1, wherein the hydrophilic silica particles are fumed silica particles.

22. The method of claim 1, wherein the hydrophilic silica particles have an average overall particle size of about 100 nm or more.

23. The method of claim 1, wherein the hydrophobic silica particles have an average overall particle size that is about five times or less the average overall particle size of the hydrophilic silica particles.

24. The method of claim 1, wherein the hydrophilic silica particles have a surface area of about 50 m²/g or less.

25. The method of claim 24, wherein the hydrophilic silica particles have a surface area of about 35 $m^2/g$ or less.

26. The method of claim 1, wherein the silica dispersion is combined with about 8-36 μmole/$m^2$ (based on the BET surface area of the silica) of the silyl amine treating agent.

27. The method of claim 26, wherein the silica dispersion is combined with about 9-18 μmole/$m^2$ (based on the BET surface area of the silica) of the silyl amine treating agent.

28. The method of claim 1, wherein the reaction mixture comprises no more than about 15 wt. % of an organic solvent.

29. The method of claim 28, wherein the reaction mixture is free of an organic solvent.

30. The method of claim 1, wherein the reaction mixture consists essentially of the colloidal silica dispersion and the silyl amine treating agent.

31. The method of claim 1, wherein the pH is about 9-11.

32. The method of claim 1, wherein the hydrophobic silica particles are neutralized prior to drying.

33. The method of claim 1, wherein the aqueous colloidal dispersion of silica is stabilized.

34. The method of claim 1, wherein the reaction mixture comprises no more than about 5 wt. % of an organic solvent.

35. The method of claim 1, wherein the reaction mixture comprises no water immiscible organic solvent.

36. A method of preparing a toner composition comprising
   (a) preparing hydrophobic silica particles by the method of claim 1, and
   (b) combining the hydrophobic silica particles with toner particles to provide a toner composition.

37. A method of preparing a polymer composition comprising
   (a) preparing hydrophobic silica particles by the method of claim 1, and
   (b) combining the hydrophobic silica particles with a polymer to provide a polymer composition.

38. The method of claim 37, wherein the polymer composition is an epoxy, a coating composition, a film-forming composition, or a plastic composition.

* * * * *